(12) United States Patent
Verma et al.

(10) Patent No.: US 11,140,152 B2
(45) Date of Patent: Oct. 5, 2021

(54) DYNAMIC RISK DETECTION AND MITIGATION OF COMPROMISED CUSTOMER LOG-IN CREDENTIALS

(71) Applicant: Guardinex LLC, Blue Ash, OH (US)

(72) Inventors: Vishal Verma, Blue Ash, OH (US); Aravind Immaneni, New York, NY (US)

(73) Assignee: Guardinex LLC, Blue Ash, OH (US)

(*) Notice: Subject to any disclaimer, the term of this patent is extended or adjusted under 35 U.S.C. 154(b) by 322 days.

(21) Appl. No.: 16/411,290

(22) Filed: May 14, 2019

(65) Prior Publication Data

US 2019/0349351 A1    Nov. 14, 2019

Related U.S. Application Data

(60) Provisional application No. 62/671,161, filed on May 14, 2018.

(51) Int. Cl.
| | |
|---|---|
| *H04L 9/32* | (2006.01) |
| *G06F 21/30* | (2013.01) |
| *H04L 29/06* | (2006.01) |
| *G06F 16/951* | (2019.01) |

(52) U.S. Cl.
CPC .......... *H04L 63/083* (2013.01); *G06F 16/951* (2019.01); *H04L 63/101* (2013.01); *H04L 63/30* (2013.01)

(58) Field of Classification Search
CPC ......... H04L 63/08; H04L 63/083; H04L 9/32; G06F 16/957; G06F 21/30; G06F 21/44
USPC .... 713/182, 183, 184, 185, 168, 170; 726/2, 726/27, 28
See application file for complete search history.

(56) References Cited

U.S. PATENT DOCUMENTS

| | | |
|---|---|---|
| 8,875,267 B1 | 10/2014 | Kolman et al. |
| 2017/0161520 A1 | 6/2017 | Lockhart, III et al. |
| 2018/0288073 A1* | 10/2018 | Hopper .............. G06Q 20/4016 |
| 2019/0132337 A1* | 5/2019 | Park .................... H04L 63/1416 |
| 2019/0222597 A1* | 7/2019 | Crabtree ............. H04L 63/1425 |

FOREIGN PATENT DOCUMENTS

WO    WO 2017/196609 A1    11/2017

* cited by examiner

*Primary Examiner* — Izunna Okeke
(74) *Attorney, Agent, or Firm* — BakerHostetler

(57) ABSTRACT

This invention relates to a process for detecting and mitigating risk generated when a customer's log-in credentials are compromised. A significant majority of stolen credentials and customer's personally identifiable information data eventually make their way to the dark web. By dynamically monitoring the dark web and combining the analysis with related information about the user and their credentials on the deep web and the surface web, through a machine learning model, a service provider pre-emptively or otherwise can act to mitigate the risk arising from such compromise of said customer log-in credentials.

10 Claims, 11 Drawing Sheets

FIG. 3

| Unique Controls | 111. Unique controls at a Service Provider for credentials |
|---|---|
| 1 | User Name for login is same as email address |
| 2 | Complexity Rules for password |
| 3 | Force Password change every 90 days |
| 4 | Allow self-service password reset via email |
| 5 | Allow self-service password reset via one-time-code to mobile phone |
| 6 | Allow self-service password reset by answering Personally Identifiable Questions |
| 7 | ... |

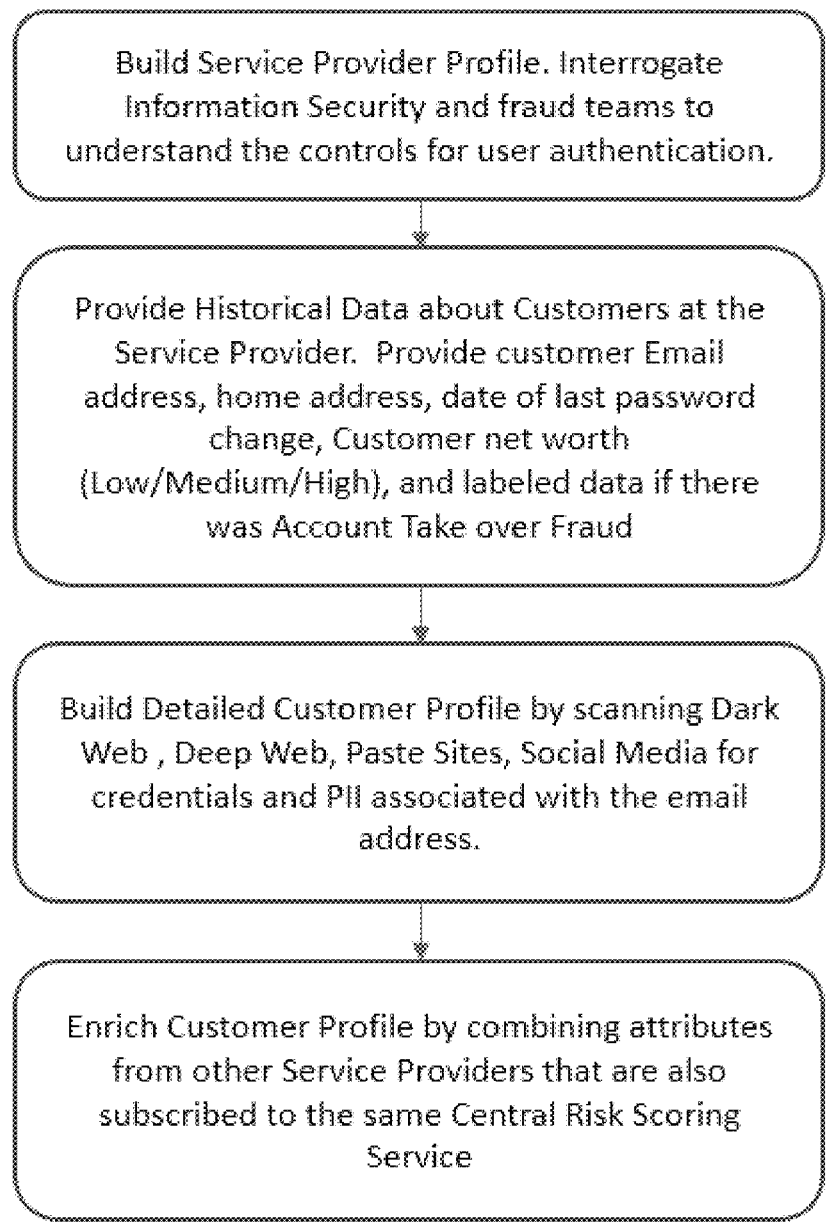
FIG. 4.1

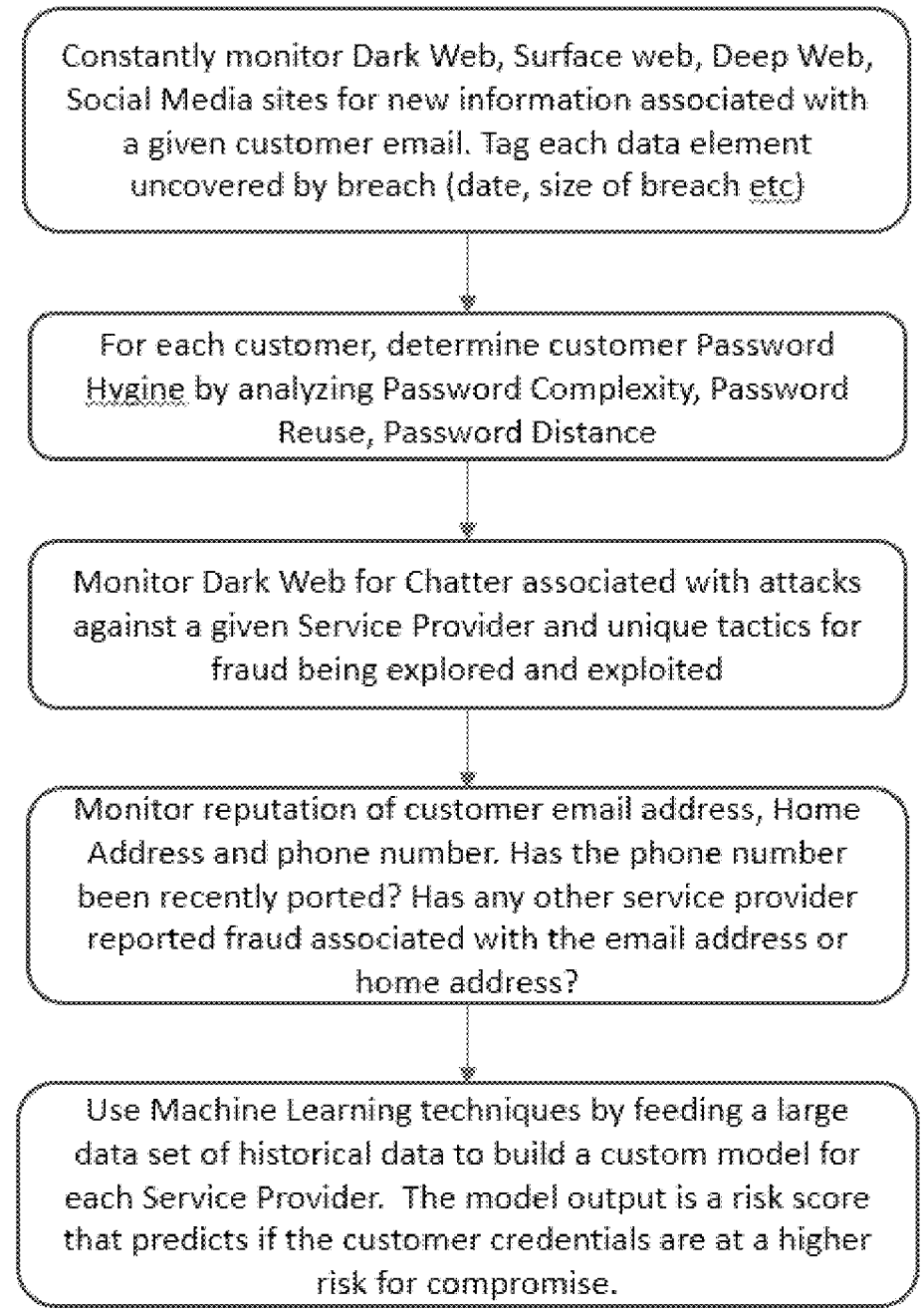
FIG. 4.2

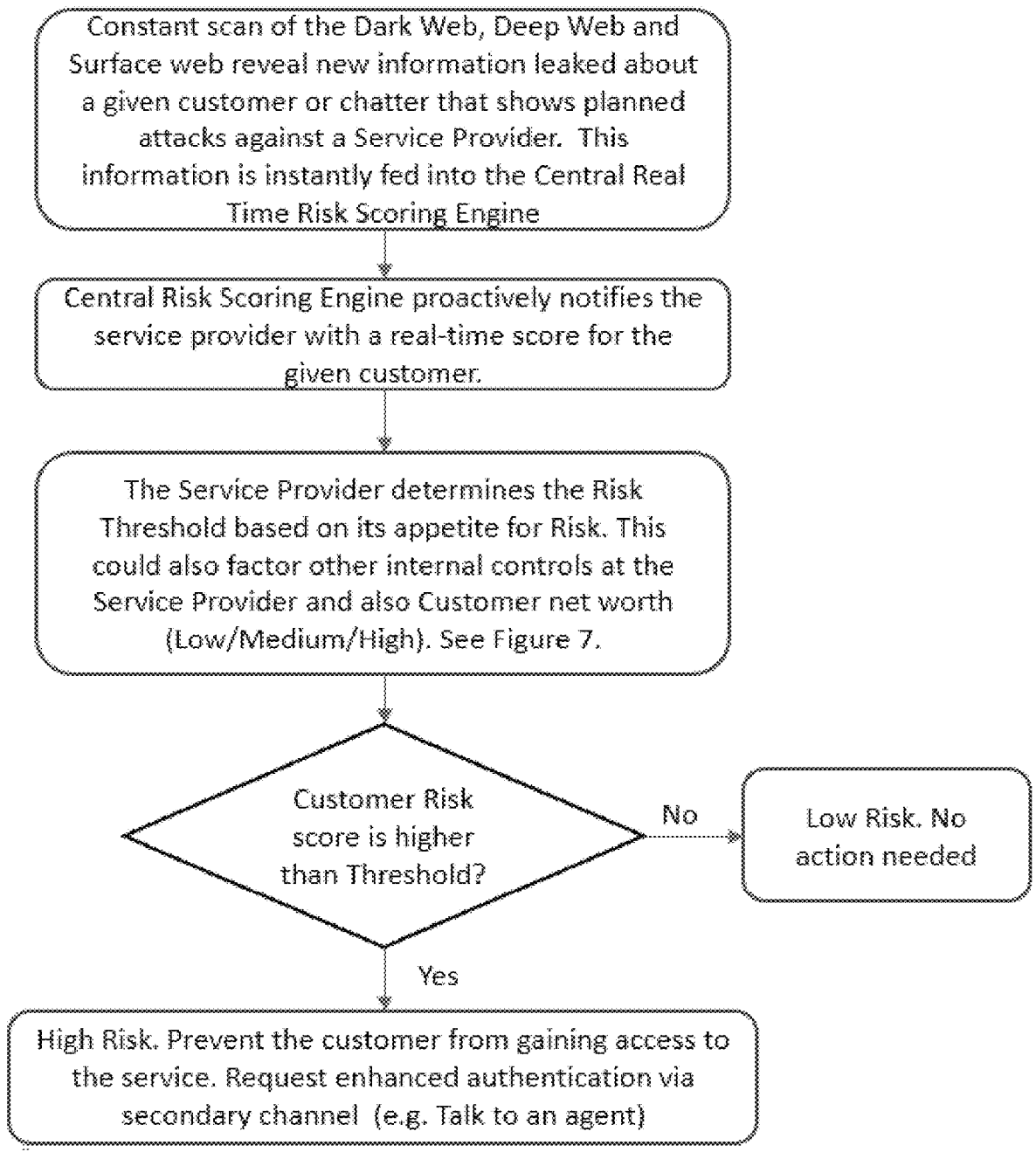
FIG. 4.3

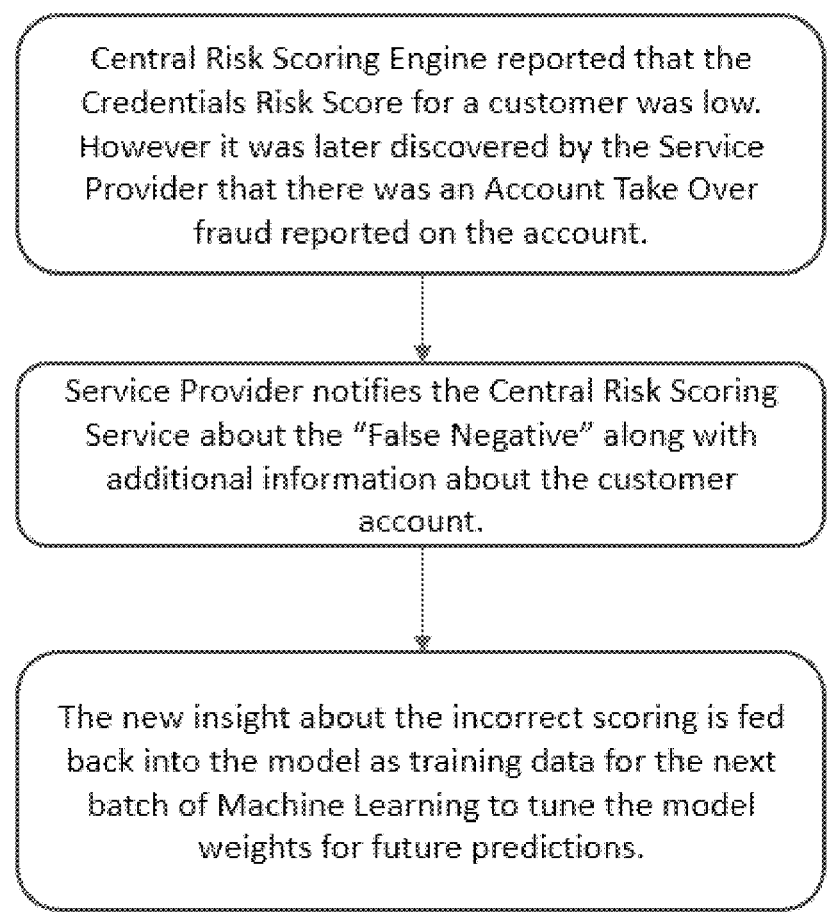
FIG. 4.4

DYNAMIC RISK DETECTION AND MITIGATION OF COMPROMISED CUSTOMER LOG-IN CREDENTIALS

CROSS REFERENCE TO RELATED APPLICATIONS

This application claims the benefit of U.S. Provisional Application No. 62/671,161, filed May 14, 2018, the entirety of which is incorporated herein for any and all purposes.

FIELD OF THE INVENTION

The present disclosure generally relates to monitoring the dark web for leaked data related to a customer's log-in credentials (CLC) at a service provider, such as usernames, email addresses, passwords, PIN codes and other personally identifiable information (PII).

By aggregating data across multiple industries and from multiple compromise episodes; leveraging that aggregation in concert with the specific controls and processes at a given service provider; and coupling it with factors such as the frequency and recency of credential sale and the extent and age of compromised data for a specific CLC; the machine learning models of the present invention enable an increasingly accurate prediction of the risk of the CLC compromise, in real time, for a specific customer at the specific service provider. In turn, this allows for a dynamic and pre-emptive risk detection and mitigation for the service provider. More specifically, this invention allows for the dynamic risk detection and mitigation for a specific CLC regardless of a specific transaction that the customer may engage in.

BACKGROUND

The present disclosure relates generally to the field of computing system security, and more specifically, to enhanced authentication of a customer log-in credential (CLC) with assistance of dark web analytics.

Network-connected computing systems often require CLC to be provided and authenticated before granting computer access to services and information. For example, an end user of a computing device such as a, mobile device, a desktop, and a laptop may provide CLC to access an online financial services account, or to facilitate an online transaction via the financial services account.

Most customers tend to reuse a limited set of CLC such as their e-mails and passwords across a multitude of service providers. If a customer's CLC are breached at the first service provider, their likelihood of compromise increases at the second service provider. The number of credential breaches over the last few years has increased exponentially, with a high likelihood for most of these sensitive CLC and PII data now available on the dark web. In addition to the CLC data, the customer's sensitive personal data are not only widely stolen from past security breaches but are also traded on the dark web. These can include Personally Identifiable Information (PII) such as street address, phone number, mother's maiden name, and social security number. Fraudsters avail answers to a customer's other security questions (typically referred to as out-of-wallet questions) and can now access accounts and reset passwords using a combination of the compromised data even in absence of the specific username and password.

In fact, malicious users can also break into a customer's primary email account or gain access to the customer's mobile phone. They can then trigger a password reset at the service provider and use the password reset link to gain access to the service.

SUMMARY OF THE INVENTION

By collating the information about a given customer across the dark web, one can make a determination about the password hygiene, for example, password complexity, reuse of variants of the same password across multiple sites, to determine the risk of credentials being compromised. By combining this analysis with information about the reputation of the customer's email and mobile phone, for example, length of service, participant in prior fraud, recent change in ownership etc.), one can further differentiate the risks. A further enhancement of risk can be achieved by monitoring the dark web chatter for planned attacks against the Service Provider while also accounting for the unique security controls for customer authentication at the Service Provider. This allows for a pre-emptive risk detection and mitigation at the Service Provider using a "Risk Score" for a given customer login-credential CLC (username and password) at a given Service Provider and a specific point in time.

According to one aspect of the present disclosure, information about the Users or Customers of a Service Provider can be continuously aggregated using machine learning models from a multitude of cross-industry sources on the open web or the Deep Web including data from the Dark Web to form a detailed profile about each Customer. The data gathered about each individual User or Customer resembles the data gathering efforts undertaken by Malicious Users. Another key input is the unique controls of a Service Provider for the authentication and password reset process combined with monitoring of the unique threats against a given Service Provider. The resulting data can then be used to form a proactive and dynamic risk score in real-time for any given customer that is tuned to the unique controls of a given service provider.

In one embodiment, this invention relates to a method for preemptively reducing the risk of compromising the login credentials of a Customer Cn, comprising the steps of:
(A) continuously searching data elements in at least one website of the dark web and at least one website of one of the deep web and the surface web or both of the deep web and the surface web, for information associated with said login credential,
wherein said searching of data elements in the deep web is based, at least in part, on the information from the dark web,
wherein searching the data elements in a surface web are based, at least in part, on the data elements' information from the dark web and/or the deep web, and wherein said dark web is accessible over an anonymous network;
(B) incorporating the unique authentication and access controls of the Service Provider with the information in Step A;
(C) determining a dynamic Risk Score for said login credential of said Customer Cn using the formula:

$$R(C_n, SP_i, t) = f\{X1, X2, X3 \ldots \}$$

wherein the dynamic Risk Score R is specific to a Customer Cn, at a specific Service Provider SPi, and at a given time t;
wherein said dynamic Risk Score is a function of Xs, wherein said Xs are data elements;

wherein said dynamic Risk Score is calculated using multivariate machine-learning models such that they intelligently analyze said data elements Xs and provide said dynamic Risk Score;

wherein said dynamic Risk Score, as it relates to said specific Service Provider SPi, is dynamically communicated to said specific Service Provider SPi prior to a transaction request, and not after said transaction request using an application programming interface (API);

(D) comparing said dynamic Risk Score, dynamically or periodically with a pre-determined threshold Risk Score; and taking one of the following steps:

(D1) modifying an authentication requirement for the Customer and seeking said authentication from the Customer, wherein said authentication requirement is a function of the breach of said pre-determined threshold Risk Score;

(D2) modifying an authentication requirement for the Customer, while temporarily suspending services to said Customer credential, pre-emptively notifying the Customer of said suspension, seeking said authentication from said Customer, and restarting or shutting down services connected to said Customer credentials.

This invention also relates to a computer program product comprising: a computer readable storage medium comprising computer readable program code embodied therewith, the computer readable program code comprising:

(A) computer readable program code configured to continuously receive information obtained from searching data elements in at least one website of the dark web and at least one website of one of the deep web and the surface web or both of the deep web and the surface web, for information associated with a login credential, wherein said searching of data elements in the deep web is based, at least in part, on the information from the dark web, wherein searching the data elements in a surface web are based, at least in part, on the data elements' information from the dark web and/or the deep web, and wherein said dark web is accessible over an anonymous network;

(B) computer readable program code configured to dynamically incorporate the unique authentication and access controls of the Service Provider with the information in computer readable program code in (A);

(C) computer readable program code configured to determine a dynamic Risk Score for said login credential of said Customer Cn using the formula:

$$R(C_n, SP_i, t) = f\{X1, X2, X3 \ldots\}$$

wherein the dynamic Risk Score R is specific to a Customer Cn, at a specific Service Provider SPi, and at a given time t, wherein said dynamic Risk Score is a function of Xs, wherein said Xs are data elements, wherein said dynamic Risk Score is calculated using multivariate machine-learning models such that they intelligently analyze said data elements Xs and provide said dynamic Risk Score; a risk score, at least in part, on the information associated with a User login credentials;

(D) computer readable program code configured to compare said dynamic Risk Score, dynamically or periodically with a pre-determined threshold Risk Score;

(E) computer readable program code configured to modify an authentication requirement for the Customer and seeking said authentication from the Customer, wherein said authentication requirement is a function of the breach of said pre-determined threshold Risk Score; and (F) computer readable program code configured to modify an authentication requirement for the Customer, while temporarily suspending services to said Customer credential, pre-emptively notifying the Customer of said suspension, seeking said authentication from said Customer, and restarting or shutting down services connected to said Customer credentials.

This invention further relates to a system comprising:

(A) a data processor configured to execute a first set of instructions to: continuously search data elements in at least one website of the dark web and at least one website of one of the deep web and the surface web or both of the deep web and the surface web, for information associated with said login credential, wherein said searching of data elements in the deep web is based, at least in part, on the information from the dark web, wherein searching the data elements in a surface web are based, at least in part, on the data elements' information from the dark web and/or the deep web, and wherein said dark web is accessible over an anonymous network;

(B) a system configured to incorporate the unique authentication and access controls of the Service Provider with the information in System A;

(C) a Credential Risk Scoring Engine configured to determine a dynamic Risk Score for said login credential of said Customer Cn using the formula:

$$R(C_n, SP_i, t) = f\{X1, X2, X3 \ldots\}$$

wherein the dynamic Risk Score R is specific to a Customer Cn, at a specific Service Provider SPi, and at a given time t;

wherein said dynamic Risk Score is a function of Xs, wherein said Xs are data elements;

wherein said dynamic Risk Score is calculated using multivariate machine-learning models such that they intelligently analyze said data elements Xs and provide said dynamic Risk Score;

wherein said dynamic Risk Score, as it relates to said specific Service Provider SPi, is dynamically communicated to said specific Service Provider SPi prior to a transaction request, and not after said transaction request using an application programming interface (API);

(D) a data processor to compare said dynamic Risk Score in (C), dynamically or periodically, with a pre-determined threshold Risk Score;

(E) a system configured to modify an authentication requirement for the Customer and seeking said authentication from the Customer, wherein said authentication requirement is a function of the breach of said pre-determined threshold Risk Score; and (F) a system configured to modify an authentication requirement for the Customer, while temporarily suspending services to said Customer credential, pre-emptively notifying the Customer of said suspension, seeking said authentication from said Customer, and restarting or shutting down services connected to said Customer credentials.

BRIEF DESCRIPTION OF THE DRAWINGS

The embodiments are illustrated by way of example and not limitation in the figures of the accompanying drawings in which like references indicate similar elements.

FIG. 3. is an illustration of some of the numerous controls (111) of a given Service Provider (110) for validating and resetting User credentials. The Credential Risk Scoring engine can be tuned to tailor the risk score based on the unique controls at each Service Provider in accordance with certain embodiments of the present disclosure;

FIG. 4.1 through 4.4 are Flow Charts that describe the high-level processes for building key aspects of the solution. They include building the initial Service Provider and Customer Profiles and the Machine Learning Models for Risk Scoring. They also show the proactive real-time risk scoring and the feedback mechanism to improve the predictions;

DETAILED DESCRIPTION OF THE INVENTION

Figure 1:
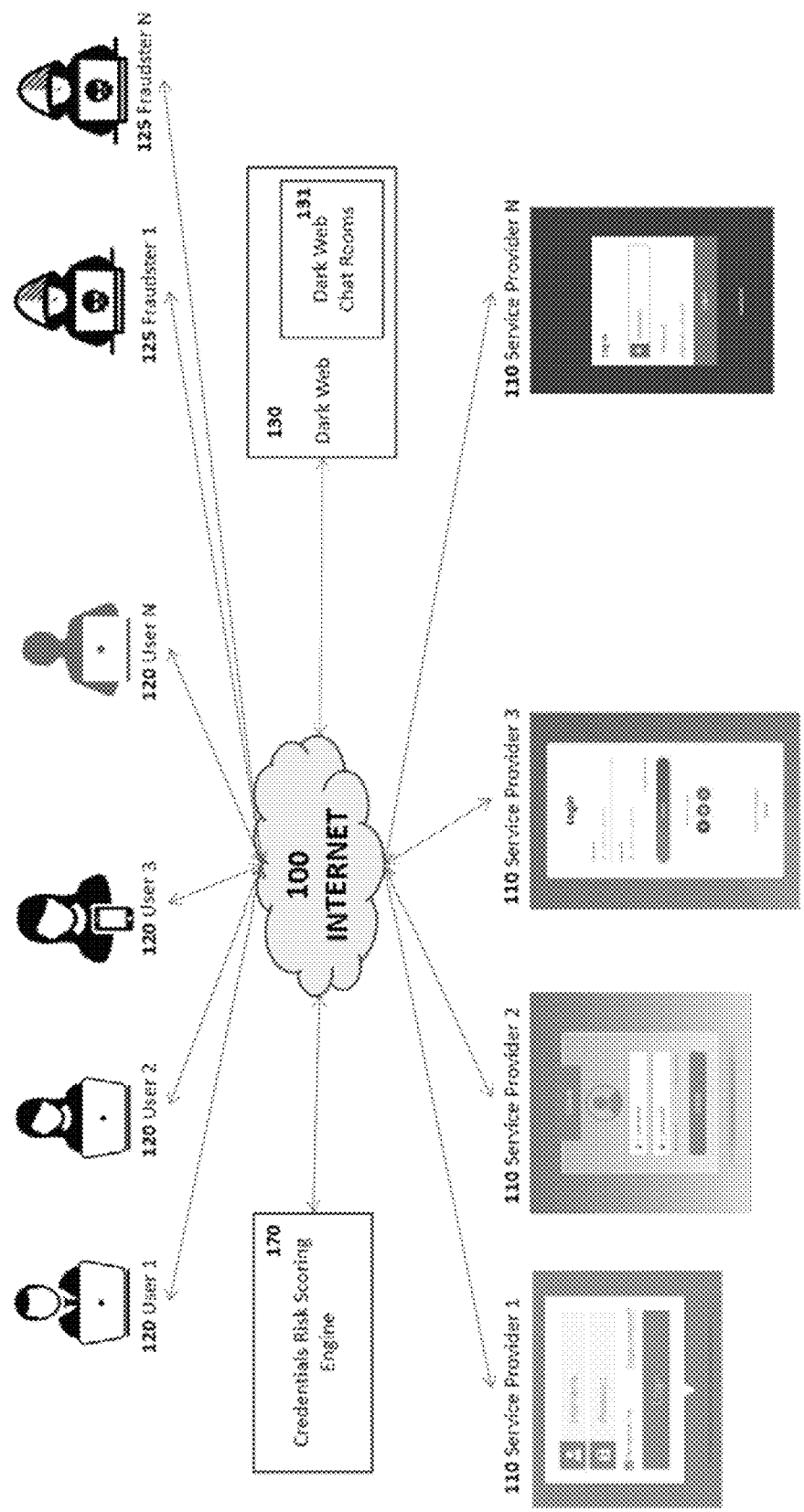
FIG. 1 shows the Credential Risk Scoring Engine (170) that proactively identifies the credential risk for individual Customers who use the services of a multitude of Service Providers (110) that are connected to the Internet (100) in accordance with certain embodiments of the present disclosure.

By a "Service Provider" is meant any institution that provides a service to a multitude of Users or Customers over the internet and requires secure authentication to uniquely identify the User and allow access to their services. A Service Provider could be a bank, a financial services institution, a retailer, an online merchant, a social media platform, an educational institution, a news site, a business corporation, a non-profit organization, an enterprise, a brokerage firm, a credit union, a utility provider, an online video-streaming service, an online gaming service, a blog site, and many others. In many instances in this disclosure the Service Provider is abbreviated as "SP".

By "User" or "Customer" is meant one or more real persons; non-real persons, bots for example; formal or informal entities, for example, a corporation, an unincorporated business; a family unit or sub-unit; or a formal or an informal unit of people that is interested in partaking the services of such SP.

The dark web, the deep web, and the surface web may be collectively referred to as the WEB.

For purposes of illustrating certain exemplary techniques for dynamically availing the risk score, the risk profile, and enhancing the authentication of the User with assistance from dark web analytics in the computing environment such as the internet, it is important to understand the communications that may be traversing the network environment. The following foundational information may be viewed as a basis from which the present disclosure may be properly explained.

The secure authentication process to avail service at a given Service Provider often requires that the Customer or the User provide customer log-in credentials (CLC) and be validated before granting access to computing services and information. For example, an end user of a computing device, for example, a mobile device, desktop, or a laptop, may provide CLC to access an online financial services account or to facilitate an online transaction by means of the financial services account.

CLC can include, for example, a user identifier, an e-mail, a password, and a personal identification number (PIN). For a plurality of SPs, the user identifier is typically their email address. For the same SP, a customer can have one or more CLC. The CLC can be working or defunct.

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

As will be appreciated by one skilled in the art, aspects of the present disclosure may be illustrated and described herein in any number of patentable classes or contexts including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementations that may all generally be referred to herein as a "circuit," "module," "component," "logic," "engine," "generator," "agent," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but is not limited to, an electronic, magnetic, optical, electromagnetic, or semiconductor system, apparatus, or device, or any suitable combination of the foregoing. More specific examples (a non-exhaustive list) of the computer readable storage medium includes the following: a portable computer diskette, a hard disk, a random access memory (RAM), a read-only memory (ROM), a programmable read-only memory (PROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency (RF), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, assembly language, or other programming languages. The program code may execute entirely on a local computer (e.g., server, server pool, desktop, laptop, appliance, etc.), partly on the local computer, as a stand-alone software package, partly on the local computer and partly on a remote computer, or entirely on a remote computer. In the latter scenario, the remote computer may be connected to the local computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS). Generally, any combination of one or more local computers and/or one or more remote computers may be utilized for executing the program code.

Aspects of the present disclosure are described herein with reference to flowchart illustrations, interaction diagrams, and/or block diagrams of methods, apparatuses (systems) and computer program products according to embodiments of the disclosure. It will be understood that each block of the flowchart illustrations and/or block diagrams, each interaction of the block diagrams, combinations of blocks in the flowchart illustrations and/or block diagrams, and/or combinations of interactions in the block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks and/or functions/acts specified in the interactions of the block diagram block or blocks.

These computer program instructions may also be stored in a computer readable medium that, when executed, can direct a computer, other programmable data processing apparatus, or other devices to function in a particular manner, such that the instructions when stored in the computer readable medium produce an article of manufacture including instructions that, when executed, cause a computer to implement the function/act specified in the flowchart and/or block diagram block or blocks and/or the function/act specified in the interaction or interactions of the block diagrams. The computer program instructions may also be loaded onto a computer, other programmable instruction execution apparatus, or other devices to cause a series of operations to be performed on the computer, other programmable apparatuses or other devices to produce a computer implemented process such that the instructions, which execute on the computer or other programmable apparatus provide processes for implementing the functions/acts specified in the flowchart and/or block diagram block or blocks and/or functions/acts specified in the interaction or interactions of the block diagrams.

The world wide web is a software layer that provides a mechanism for exchanging information over the Internet. The world wide web runs over a system of Internet servers that can support documents formatted in Hypertext Markup Language (HTML) and use Hypertext Transfer Protocol (HTTP), which is an application protocol that facilitates data communications of the HTML documents in distributed information systems.

Some statistics indicate that common (e.g., commercial) search engines provide access to only 5-15% of the content available over the Internet. This content, which is accessible by common search engines, is referred to as the surface web. The deep web and dark web make up the rest of the content. The deep web contains information that cannot be indexed and found by a typical search engine. For example, deep web information may be contained in websites (e.g. government databases and libraries, etc.) and searched directly in the website rather than through a common search engine. Other examples of deep webpages include pages that are not linked by other pages searchable by a standard search engine, archived versions of webpages, dynamic pages that are returned by a server in response to a specific query, textual content encoded in multimedia files, etc. Standard browsers, however, can generally be used to access deep web content that is not part of the dark web.

The dark web is a subset of objects (e.g., pages of HTML and non-traditional content) of the deep web and is accessible over anonymous network. In the dark web, the information (or content) is intentionally hidden and is inaccessible through standard web browsers. Special software is used to access the dark web including, but not limited to 'The Onion Router' or 'Tor,' and Invisible Internet Project (I2P) services. I2P is an anonymous peer-to-peer distributed communication layer designed to allow applications to send messages to each other pseudonymously and securely. Tor is software that can be installed into a browser to enable special connections to dark websites that offer hidden services and resources. These hidden services and resources may be provisioned in non-standard top-level domains such as .Onion (dot onion), for example. Thus, once a dark top-level domain is identified, at least some dark websites can be identified based on their corresponding uniform resource locator (URL). When the Tor browser is invoked, a connection may be made to a Tor router (or Onion router) that encrypts the network address (e.g., Internet Protocol (IP) address) of the connecting device. The communication also gets propagated through numerous randomly selected routers, potentially around the globe. Tor's encryption and routing techniques prevent the communication from being traced back to its source. Thus, user identities and host identities can remain anonymous. This ability to maintain anonymity in browsing and serving activities essentially invites illegal activity to flourish within the Tor network.

The Internet is a global network infrastructure interconnecting a vast array of networks. Anonymous network is a portion of the Internet in which special anonymizing software networks allow access to the dark web. The dark web is widely known for facilitating illicit and/or nefarious activities due to anonymity associated with special browsers (e.g., Tor) used to access services and resources. For example, the dark web has been used for activities that include, but are not limited to human trafficking, wildlife trafficking, illegal sales and distribution of weapons, money laundering and theft, as well as offering an environment where these activities can be secretly discussed, planned, and executed. In particular examples, the dark web has been used to sell stolen credit card details and to discuss possible hacking methods to bypass a financial institution's secure payment systems. Because the dark web offers anonymity to its community of users, users may be willing to communicate more freely regarding their intents, plans, desires, knowledge or any other information related to topics (e.g., hacking, stealing, etc.) that motivate the users to conceal their identities.

Hackers, also known as "malicious users," have a multitude of tools available to hack into computer systems of organizations, such as banks and other financial institutions. Millions of dollars have been lost through some financial systems due to security holes in associated payment systems. In a recent real-life scenario, hackers attacked a particular financial system and stole more than 2.5 million pounds from customer accounts. Although breaching the financial system itself may not necessarily have involved the use of the dark web, news outlets reported that, prior to the attack, information exchanges among the community of users in the dark web included content related to the targeted financial institution and its computer security weaknesses or flaws. That is, 'chatter' increased on the dark web that pertained to the hacking and/or targeted financial institution. Due to the nature of the dark web, however, accessing its services and resources is not commonly done by reputable financial institutions and other enterprises. Consequently, indications of a risk that may be observed in the dark web is not generally or readily available to financial institutions or other enterprises.

Conventionally, in response to a breach of a company's data security, a press release may be issued, and affected customers may be notified. In some instances, compromised data may be used by criminals to open new credit accounts or to attempt to gain access to a customer's account. In some instances, such as when a Service Provider's records are compromised, a large amount of customer data, including multiple customer accounts, may be compromised. Data from such data breaches can end up being sold online through websites and private servers.

As used herein, the term "exposed data" or "compromised data" refers to any part of customer log-in credential (CLC) or personally identifying information (PII) that may have been compromised or breached, such that an unauthorized individual may have gained access to such information. In certain embodiments, the PII data may include names, dates of birth, usernames, passwords, addresses, social security numbers, email addresses, phone numbers, credit card numbers, bank information, other data, or any combination thereof. Such data may be used to identify a particular consumer, and which may be misused to attempt to open accounts (such as new services, lines of credit, and so on), gain access to existing accounts, and so on.

Communications in computing environment 100 may be inclusive of packets, messages, requests, responses, replies, queries, etc. Communications may be sent and received according to any suitable communication messaging protocols, including protocols that allow for the transmission and/or reception of packets in a network. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). Particular messaging protocols may be implemented in the computing environment where appropriate and based on particular needs. Additionally, the term 'information' as used herein, refers to any type of binary, numeric, voice, video, textual, multimedia, rich text file format, HTML, portable document format (pdf), or script data, or any type of source or object code, or any other suitable information or data in any appropriate format that may be communicated from one point to another in electronic devices and/or networks. Information as used herein also includes fragments of such data.

In general, "servers," "computing devices," "network elements," "database servers," "client devices," and "systems," etc. (e.g., 100, 110, 170 etc.) in example computing environment 100, can include electronic computing devices operable to receive, transmit, process, store, or manage data and information associated with computing environment 100. As used in this document, the term "computer," "processor," "processor device," or "processing element" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, computing devices, network elements, database servers, systems, client devices, system, etc. (e.g., 100, 100, 170, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, the Credentials Risk Scoring Engine (CRS Engine; 170) can be at least partially (or wholly) cloud-implemented, web-based, or distributed to remotely host, serve, or otherwise manage data, software services and applications interfacing, coordinating with, dependent on, or used by other systems, services, and devices in computing environment 100. In some instances, a server, system, subsystem, and/or computing device can be implemented as some combination of devices that can be hosted on a common computing system, server, server pool, or cloud computing environment and share computing resources, including shared memory, processors, and interfaces.

In one implementation of the present invention, the CRS Engine includes software to achieve the real-time risk score of a given set of CLC, data aggregation from the deep web, the dark web and the surface web, profiling of the Service Provider's controls, and real-time alerts, as outlined in this specification. Note that in one example, each of these elements can have an internal structure (e.g., a processor, a memory element, etc.) to facilitate some of the operations described herein. In other embodiments, these features may be executed externally to these elements, or included in some other network element to achieve this intended functionality. Alternatively, other systems may include this software (or reciprocating software) that can coordinate with other network elements in order to achieve the operations, as outlined herein. In still other embodiments, one or several devices may include any suitable algorithms, hardware, software, firmware, components, modules, interfaces, or objects that facilitate the operations thereof.

Referring now to FIG. 1, it shows the Credential Risk Scoring Engine (170) that proactively identifies the risk for multiple Service Providers (SP) 1 . . . N (110) that are connected to the internet (100). Customers of the Service Providers are Users 1 . . . N (120) that connect through their computer or mobile phones to access the unique services of each of the SP. Elements of FIG. 1 may be coupled to one another through one or more interfaces employing any suitable connections (wired or wireless), which provide viable pathways for network communications. Generally, the internet 100 and anonymous Dark Web network 130 represent a series of points or nodes of interconnected communication paths for receiving and transmitting packets of information that propagate through computing environment 100. A network, such as networks 100, 130, can comprise any number of hardware and/or software elements coupled to, and in communication with, each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment or any suitable combination thereof. Unlike network 100, however, anonymous network 130 is a special anonymizing software network that can be used to access the dark web, which contains websites that are not indexed and are inaccessible through standard web browsers.

On the Dark Web there are numerous chat groups (131) that are frequented by the Malicious Users: 1 . . . N (125). These anonymous chat groups and forums are where the Malicious Users (131) share their exploits, trade their breach data, discuss weakness in the controls at various Service Providers and plan/coordinate strategies for attack against Service Providers. Critical insights can be gleaned by monitoring this 'chatter' to manage the real-time risk of an attack against a given Service Provider.

Before Users (120) try to access the services at a Service Provider (110), they must first authenticate using their CLC. Concurrently, there are other Malicious Users, Threat Actors and Fraudsters (125) that are also trying to impersonate as the real Users to gain access to the secure services at the Service Providers (110). In one embodiment of the CRS Engine, at the time of login, each SP (110) can check with the CRS Engine (170) for a real-time risk score of the User's CLC (120). Each SP can make an independent decision on how to respond to the Risk Score returned by the CRS Engine. In some cases, the Service Provider might decide to halt the login entirely or force the User to undergo an enhanced version of Authentication. However, because the CRS Engine generates a dynamic risk score, the risk score is not transaction specific. In one embodiment, the dynamic risk score pre-emptively triggers enhanced authentication of the User by an SP, regardless of the occurrence of a transaction. Such preemptive authentication could be sought in case of a threshold level is breached by the risk score (as dynamically determined by the CRS Engine).

In one embodiment, the CRS Engine gathers information from the Surface Web the Deep Web, and the Dark Web on a continuous basis, and in real time, has a risk score available for a User and/or his credentials. For example, for a hypothetical person John Doe, whose username is JohnDoe1@acmemail.com and password of USA50, the CRS Engine provides a dynamic Risk Score, that is for the moment it is desired. The SP can move forward, given the risk score, in allowing the User to avail the SP's services.

Figure 2:
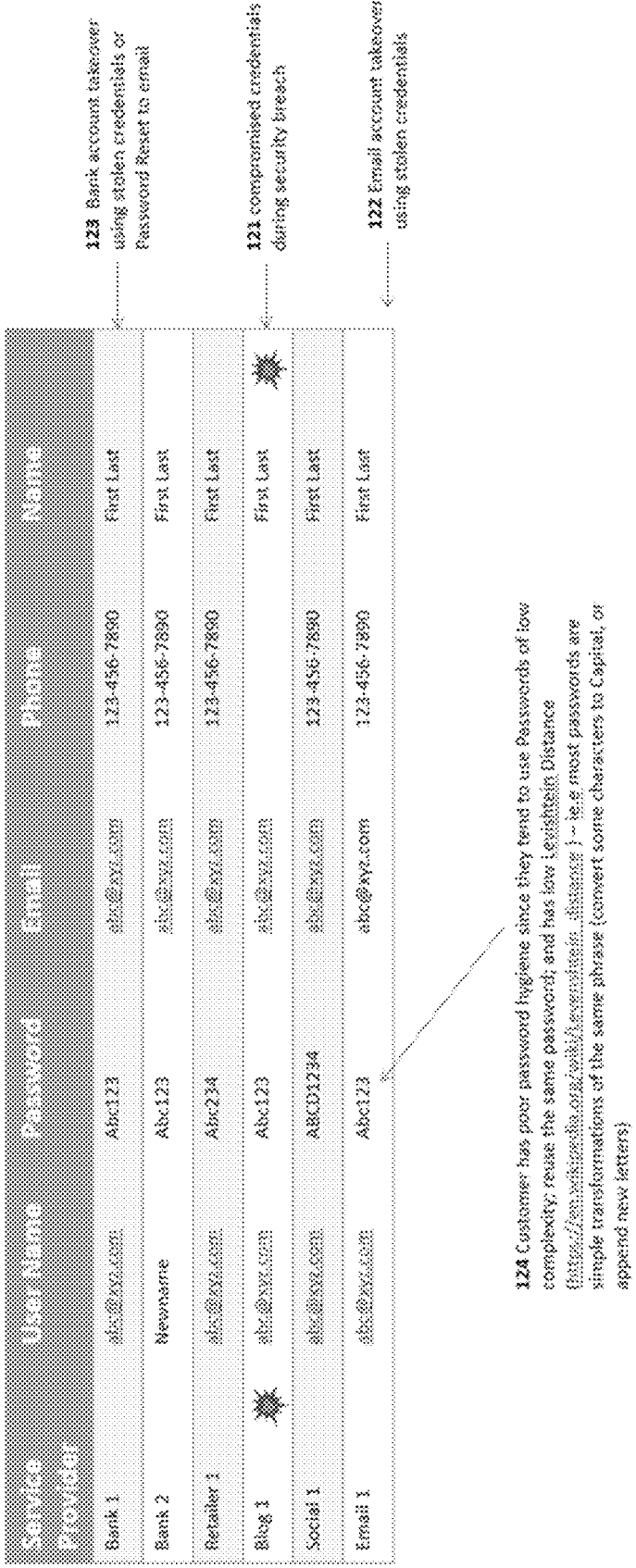
FIG. 2. is a depiction of the credentials data for a typical User (120) in accordance with certain embodiments of the present disclosure.

FIG. 2. is a depiction of the CLC data for a typical User (120). The User might have signed up for a multitude of services from a range of Service Providers (110). These secure services could include Banks, Retailers, Social Media Platform, Email Services, and the like. For each Service Provider, the User has a unique set of CLC that typically consists of username and password. In some instances, the username might be different than the email address. From a User's perspective, this CLC data could be memorized and never stored physically on any medium.

For the purpose of this illustration of an account take over, let us assume that one of this User's accounts at one of the Service Providers is breached. A Malicious User now has access to the compromised credential (121).

The Malicious User can then use this credential data against a multitude of other Service Providers in the anticipation that the same User might have setup an account with a different Service Provider using the same credentials. If the credentials match (122) at a different service provider, the fraudster has successfully taken over that account. The Malicious User might decide to change the password so that the legitimate User is now locked out of their own account.

If the Malicious User has taken control of the User's primary email account (122), they can then try to take over the victim's accounts at other Service Providers even if they use a different set of credentials (123). This is done primarily by requesting a password reset. Most Service Providers send out an email with a secure link to the User's email address. Since the Malicious User has access to the email account, they now can use this secure link to gain access to the User's account at the Service Provider. This is also known as Cross Account Takeover.

A detailed profile of the customer's "password hygiene" can be built by analyzing the patterns of their breached identities. If the clear-text passwords for multiple breaches are similar, or minor variants of the same default password, then there is a high risk that a fraudster can try a small number of permutations of the base password at other sites and have a higher probability that it will match.

Those skilled in the art can apply common technique to analyze the password complexity of the exposed passwords—e.g. some of the passwords such as "Password1!" meet the rules for having one uppercase character, one number and one special character, but are still extremely easy to guess and would have a very low password complexity score. Other low complexity passwords with a very high risk score contain common English phrases such as "tiger123" or "IloveLucy1", etc. In contrast an exposed password such as "PrXy.N(n4k7#L!eVAfp9" suggests that the User has a very high standard for password complexity.

Those skilled in the art can apply techniques such as the Levenshtein Distance (https://en.wikipedia.org/wiki/Levenshtein_distance) which measures the minimal number of single character edits to transform one string to another. For example, the Levenshtein Distance for "kitten" to "sitting" is 3.

Another important metric for password complexity is the length of the password. If the user frequently uses short passwords (8 characters or less), their credential risk score is high since there are fewer permutations of a short string.

FIG. 3. is an illustration of some of the numerous controls of a given Service Provider for validating and resetting Customer log-in credentials CLC. This information is rarely revealed publicly by a Service Provider. However, Malicious Users constantly experiment and probe to reverse-engineer the controls of a Service Provider. They share their findings on chat rooms on the Dark Web with other Malicious Users. This information is extremely useful in honing a targeted attack against a Service Provider by taking advantage of vulnerabilities in their controls.

By proactively working with the Service Providers, the Credential Risk Scoring Engine (170) documents the same level of information that is available to the Malicious Users. This information is encoded into a data model that is a unique profile for each Service Provider (172).

For example, numerous Service Provider require that the Customer identify the last 4 digits of their Social Security No. (SSN) before they can reset their online password. Other banks require the user to enter their bank account number or card number as an alternative to their username. If an SP relies on the user to type in the last 4 digits of their SSN for resetting the password and this information about the user is available in the Customer Profile (170) of the Risk Scoring Engine, then this would indicate a higher risk score.

Figure 4:
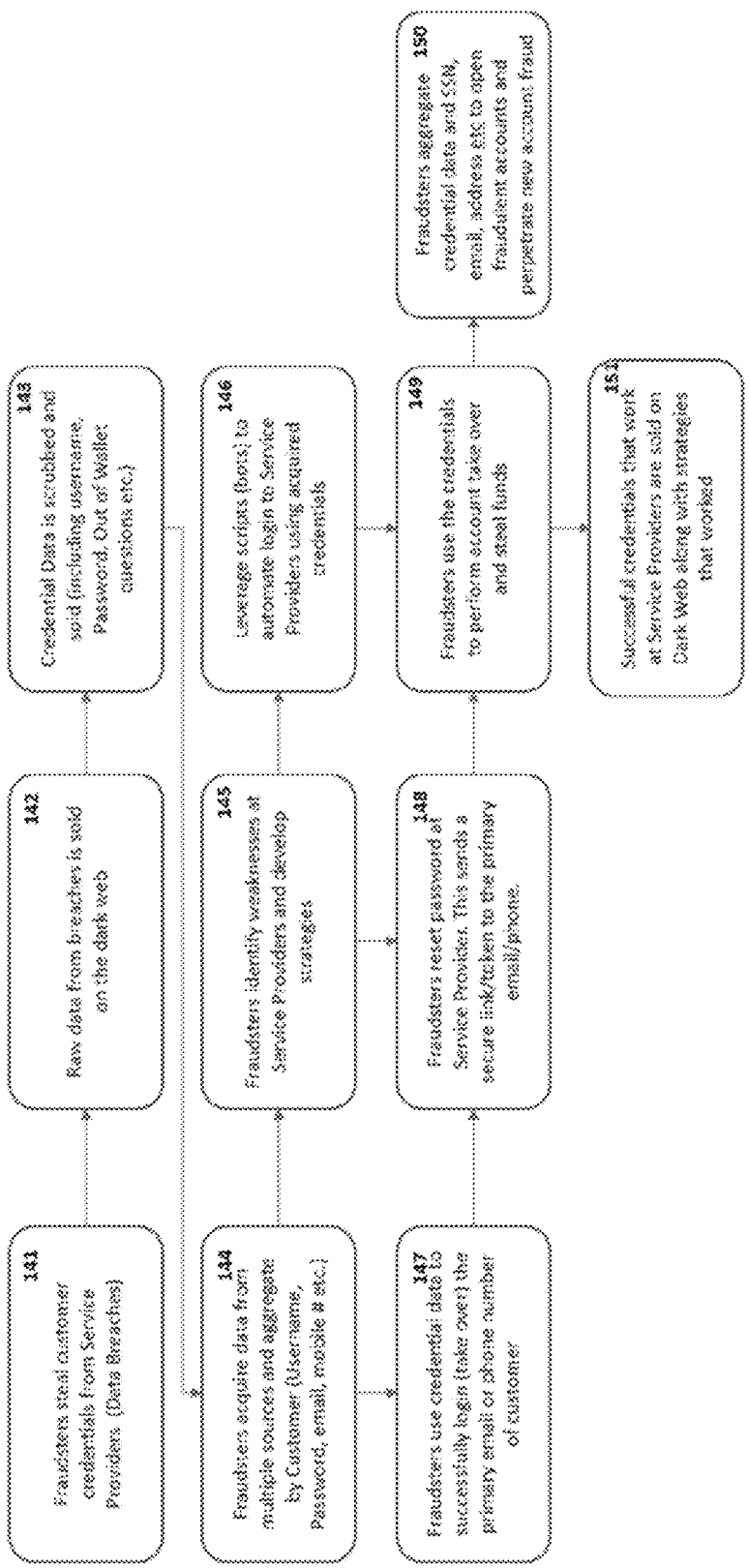
FIG. 4. Describes the typical process (140) by which the customer credential data is stolen, aggregated, and weaponized against multiple Service Providers in accordance with certain embodiments of the present disclosure.

FIG. 4. describes the typical process by which the CLC data are stolen, aggregated, and weaponized against multiple Service Providers. In one embodiment, the process of the present invention mimics these same data gathering enrichment techniques used by the Malicious User to then create a pre-emptive, real-time Credential Risk Score for a given User at a given Service Provider at a given point in time.

Box 141

This box shows how Malicious Users harvest millions of credentials. Every Service Provider is under attack daily from thousands of Malicious Users who use sophisticated tools to exploit vulnerabilities in their setup. If a Malicious User manages to successfully breach a Service Provider, their bounty typically includes the stored CLC at the Service Provider, which contains the usernames, passwords and other Personally Identifiable Information about the Customers at that Service Provider. Very often the Service Provider may not be able to detect the breach in a reasonable time, or sometimes not at all. As a result, the User may not be aware that his CLC data are now compromised and in the hands of a Malicious User.

In addition to data breach events, PII can be compromised through "phishing," which refers to a process of masquerading as a trustworthy entity in an electronic communication. An example of phishing may include a fraudulent email that appears to be from a valid source, such as, for example, a national bank or a credit card company. The fraudulent email may incorporate a uniform resource locator (URL) that re-directs the user to a fraudulent website that masquerades as a legitimate website for the real company. However, the fraudulent website may be designed to steal PII via a false transaction. For example, the fraudulent website may request "confirmation" of PII, such as, for example, a credit card number or a username and password. The "confirmed" PII may then be stored for later improper use.

Box 142

Once collected, the CLC and the PII data may be sold on a black market through various web sites and illicit data sources. Such web sites and data sources may not be registered with standard search engines, making them difficult to find through traditional web searches. Such web sites and data sources may be part of the "dark" web, which can be represented by a large number of web servers that do not permit search engine indexing and which host information for Malicious Users.

Boxes 143 and 144

They represent the aggregation of data by Malicious Users by linking a single User's account information across multiple breach events across multiple service providers. These data are further enhanced through searches across the surface web, social media sites, publicly accessible data (such as addresses or work history etc.) from websites to form a detailed profile about the User.

Box 145

Malicious Users constantly experiment and probe the authentication portals to reverse-engineer the controls of a Service Provider. A Malicious User might setup a new account with a Service Provider to learn about their strategies for validating usernames and passwords. For e.g., some financial institutions allow a customer to sign in using their 16-digit debit account number instead of their username. Some Service Providers ask for the last 4 digits of a User's SSN to reset a password. Other Service Providers allow multiple failed login attempts without locking out the account. This information is critical to formulating a strategic attack against the Service Provider since it lets the Malicious User know about what additional pieces of information to collect.

Box 146

Malicious users use automated scripts deployed to hundreds of remote computers (bots) to masquerade their login attempts to the Service Providers using the database of the millions of credentials that have been harvested. A very small percent of these automated login attempts do successfully get through, however.

Box 149, 150, and 151

They illustrate the monetization after a successful account take over.

Box 147

It shows another valuable strategy of taking over an account using a secondary channel of e-mail or phone. Most Service Providers assume that the email and phone channels are secure. They use these channels as alternate mechanisms to authenticate the user. A Malicious user takes advantage of this assumption. They will first attempt to take over a User's primary email address using the same set of CLC that have been harvested. Once they have full access to a User's e-mail address, they can use the password reset capability of most Service Providers to request a secure link via e-mail. The Malicious User, posing as the Customer now clicks on the link provided by the SP link to reset the password. In some cases, the Malicious User will reach out to the phone service provider of the User and use the data harvested over the dark web to authenticate themselves as the User. They then "port" the User's mobile phone number to their own device. As a result, any text message sent to the User, is now visible to the Malicious User.

Box 148

The password reset process varies among different Service Providers. Some SP require additional authentication before they send a link to the User's email address. These could include questions such as last four digits of the User's SSN, or the mother's name, or street address. If the Malicious User has done their research in Step 145, they would have already gathered the relevant information about the User using other data sources.

In one embodiment of this invention, the Credentials Risk Scoring Engine follows the same processes as described in Box 141, 142, 143, 144, 145, 147 and 148. By leveraging the same data that is used by Malicious User, and adopting similar methods as the Malicious User, the CRS Engine can evaluate for any point in time, for any given user and a service provider by weighing in, for example, the following questions:

How many of the credentials are available to Malicious Users?

What is the password hygiene of the given user in terms of re-use of the same credentials or simple variants of the same password across other Service Providers?

Can the Malicious User tie back the credentials to a User's email address, mobile phone and street address?

How long has the User had the same phone and email address?

Have other Service Providers reported recent fraud using the same email address?

Has there been a recent change to the User's street address?

Did someone recently port the mobile phone number for the User's phone?

How much of the CLC and the PII of the given User could be visible to the Malicious Users? (last 4 of the SSN, mothers name, birth date, work and address history etc.)?

What are the specific weaknesses at a Service Provider that can be compromised by the information gained above?

Is there any active 'chatter' on the Dark Web about planned attacks against the Service Provider?

Historically, the predictions of fraud have been based on a rule-based approach where hundreds of static rules are coded in advance to analyze if a given login via a credential is fraudulent or not. In contrast, the present invention leverages techniques of Machine Learning to build its prediction model. The approach of the present invention relies on analyzing huge volumes of historical data to find hidden patterns to build a model that can be used to make predictions on new unseen data. In addition, the WEB is continuously searched to make the risk score dynamic, for a specific moment in time, for a particular Customer, as it relates to a specific Service Provider. The dynamic risk score is computed unrelated to a transaction the Customer may make at any time. When additional compromised data will appear on the WEB, particularly the dark web, cannot be known. In addition, a skilled person must contend with the transient nature of such compromised data as they relate to CLC and PII of a Customer at an SP. Similarly, if the searching is not continuous or dynamic, for example, on specific to the transaction, and at the time of the transaction, the risk score assessment is not accurate, and basically static. This invention, in one embodiment, relates to a continuous searching of information relating to a CLC and/or PII of a Customer at an SP.

In one embodiment of the present invention, a customized machine learning model is created for a given Service Provider by gathering historical data from each SP about the CLC/PII of each customer with the additional identifier from the SP (labeled data) indicating if there was any fraud committed during that session.

Figure 6:
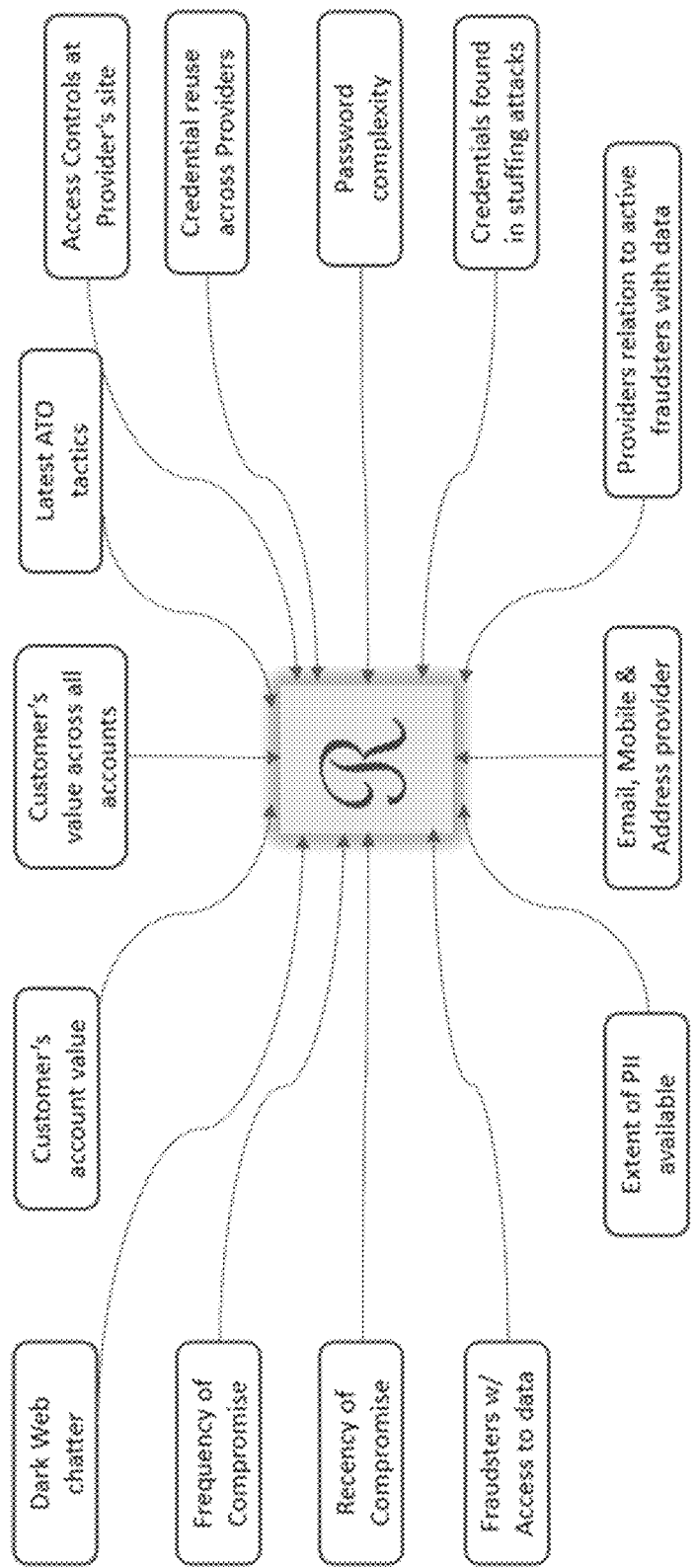
FIG. 6 is a visual representation of some of the data elements of a given customer and Service Provider, that are fed into the Machine Learning Model for the generation of the dynamic real-time risk scores.

FIG. 6 indicates some of the exemplary inputs or data elements (Xs) which are packaged from information of compromised data or exposed data or their fragments, that are fed into the machine learning model. These inputs include the following, which is a non-exhaustive list:

1. Dark web chatter
2. Frequency of compromise of the credentials
3. Recency of compromise
4. Fraudsters with access to data
5. Extent of PII available
6. E-mail, mobile and address provider information
7. Service Provider's relation to active fraudsters with data
8. Credentials found in stuffing attacks
9. Password complexity
10. Credential reuse across Service Providers
11. Access controls at Service Provider's site
12. Latest account takeover tactics
13. Customer's value across all accounts (for example net worth in various banks)
14. Customer's specific account value In one embodiment, the data elements listed above are then weighted through machine learning model and artificial intelligence models. More data elements are added based on their importance, and/or the data elements that are less important are weighted downward or are weighted zero (essentially, removed from consideration). It is an interactive and intelligent computer model that automatically weighs the data elements once more data are available from various sources.

Those skilled in the art of building machine learning models, can apply numerous techniques such as Logistic Regression, Naïve Baise Classified, Support Vector Machines (SVM), Boosted Decision Trees, Random Forest, Neural Networks, or Deep Learning, to arrive at a model that, for example, in one embodiment, accurately classifies a given transaction as fraud/not-fraud. In addition, the model is further fine-tuned to create a probabilistic risk score by "training" the model on different subsets of this large historical session data. The data are continuously collected for the given Service Provider and across the board from many service providers.

The multivariate and logistic regression models that have machine-learning capabilities are designed such that they intelligently analyze all data elements (Xs) and predict the risk of credential compromise of given customer, Cn, at a specific Service Provider, SPi at a specific point in time "t". The three dimensions of the Risk Score are denoted as: $R(C_n, SPi, t)$ and is a complex function of the Xs noted above as the data elements required for modeling the risk. As it relates to the risk factor R:

$$R(C_n, SPi, t) = f\{X1, X2, X3 \ldots\}$$

In other words, R is a complex multivariate function of the several data elements, or Xs. Stated differently, the basic unit of a credential that is availed for risk detection and mitigation incorporates the specific SP characteristic at a specific time. The risk factor R is dynamic and changes with time for a given credential at the given SP. This invention also envisions preparing a risk profile for a credential that is function of time. In other words, for a give credential associated with an SP, the SP can get a real-time "health report" of the credential. The SP has the flexibility to automatically flag accounts that cross a particular risk-factor-R threshold, generate an account alert, and/or seek pre-emptive and one or more than one self-authentications from the Customer, up to the extent determined by the model, that will reduce the risk factor R below the set threshold. This self-authentication is pre-emptive, which means even before a transaction originates, the authentication is put in place, thereby avoiding a reactive or a corrective approach. The self-authentication is not specific to a transaction.

The complexity of the model entails sophisticated big data analytic techniques to predict the risk for compromise. In one embodiment, the risk rating is validated with real data from the SP to tune the model initially, but to enhance the ML capabilities, the actual compromised credentials at the SP are fed back into the model at a regular frequency to ensure the underlying elements are appropriately utilized by the model, and new elements that may not be envisioned previously be added such that the model updates as the macro conditions change: fraudsters change tactics; the SP's controls improve; and customers increase use of advanced controls such as multi factor authentication. The model not only uses updated data as the macro conditions change, but also self-tunes to continually improve its predictive ability.

Figure 7:
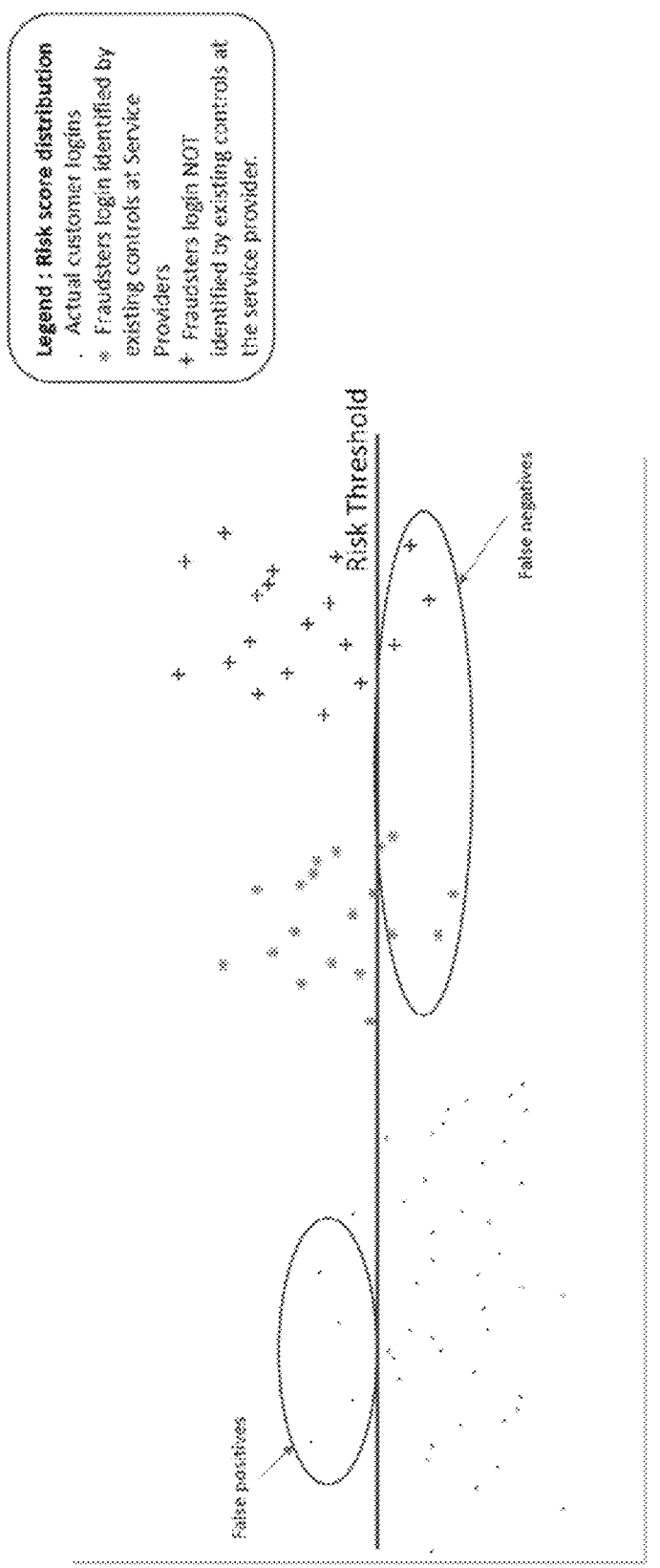
FIG. 7 is a plot of the Risk Scores of multiple legitimate Users and multiple Malicious Users/hackers at a given Service Provider.

When a machine learning model is used to create a prediction of new data, it is possible that the model might make two different kinds of errors. The model might predict a fraudulent transaction as non-fraud (this is a false negative) or it might incorrectly flag a valid CLC as a fraudulent one. A model that predicts a high number of false positives will cause a high number of customer satisfaction issues since their valid logins are being flagged as fraudulent. The SP then alters and further fine-tunes the model by defining the precision and recall parameters, as shown in FIG. 7 to find the right balance of false positives to false negatives based upon their unique needs.

Once the machine learning model has been customized for the needs of a given SP, the real-time Credential Risk Scoring Engine (170) continuously scans the WEB (dark web+deep web+surface web) for new privacy leaks and data breaches that expose the User CLC and PII.

In one example, let us assume that there is a customer with accounts at multiple SPs, each of whom subscribe to the same real-time CRS Engine. The real-time risk score for the same individual customer has a static component based on the user's profile (number of breaches of the same user credentials, password hygiene, etc.) and also has several dynamic components (recency of breaches, date of last password reset at that service provider, recency of email account take-over or mobile phone account takeover, chatter on the dark web about imminent planned attacks against a service provider). In one embodiment, the risk score for the same User could differ significantly based on the unique controls at each Service Provider. For example, a service provider that leverages use of password resets via last 4 digits of the SSN will have a higher real time risk score if this customer's SSN is leaked on the dark web.

All of these features, feed into a machine learning model that provides a real-time risk score. The machine learning model is further enhanced by a feedback loop from the Service Provider that reports on the accuracy of the predictions.

Figure 5:
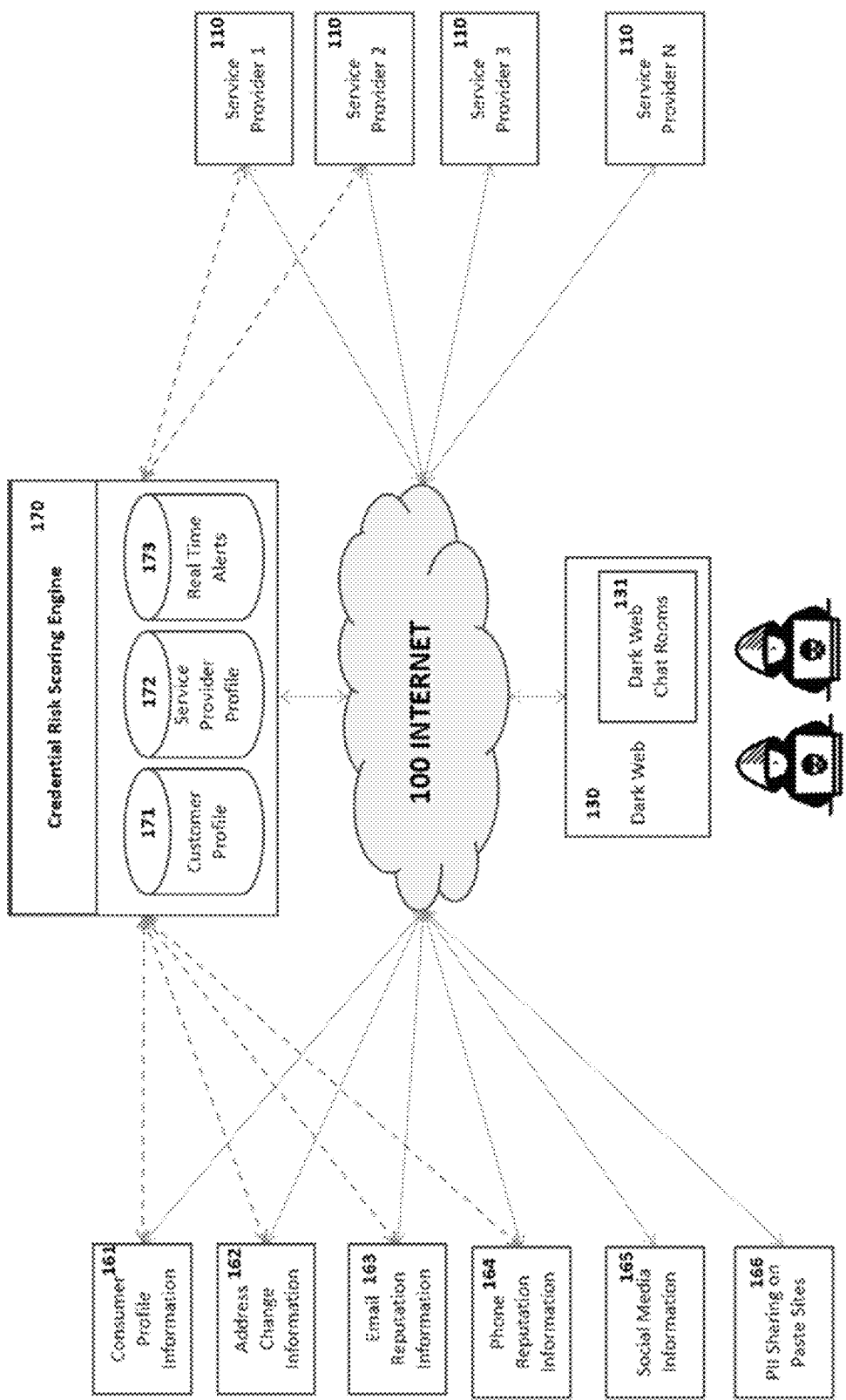
FIG. 5 describes the workings of the Real-Time Credentials Risk Scoring Engine (170) in accordance with certain embodiments of the present disclosure.

FIG. 5. describes the workings of the real-time CRS Engine (170). In one embodiment, one or more Service Providers (110) connect with the CRS Engine via the internet or via a secure encrypted connection. The CRS Engine maintains a detailed Customer profile (171) by searching multiple sources of PII related to each unique Customer and their CLC. Consumer profile information (161), address information (162), email reputation (163) and phone reputation (164) are large repositories that can be licensed and searched dynamically. The Risk Scoring Engine also scrapes social media sites (165) and paste sites (166) for PII data related to the User. Another valuable source of information is CLC and PII that are sold and shared on the WEB (the Dark Web, the Deep Web and the Surface Web). In one embodiment, the result of the searches is aggregated, indexed, and stored for each unique Customer and Service Provider in the Customer Profile Database. In addition, the system of the present invention evaluates the unique controls at each of the Service Providers and codes it in a form that can be used by the model and store it in the Service Provider profile database (172). The System also monitors the Dark Web chat groups (131), for example, for chatter related to planned attacks against a Service Provider. All these signals are used by the CRS Engine to create a dynamic Risk Score for each CLC that is tuned for the controls at each Service Provider. If the risk score exceeds a certain threshold defined by the Service Provider, the CRS Engine pro-actively and preemptively sends out real-time alerts to the relevant SP. Alternatively, the SP can monitor all accounts and CLC in real-time and further zero in on those accounts that breach a particular threshold. The SP can devise an internal protocol that correlates the number of self-authentications required from the Customer at several threshold breaches. Note, this authentication requirement is pre-emptive, in other words, generally unconnected to a particular transaction. The present invention makes transaction pre-emptively safe, and consequently, the Customer does not have to provide authentications at the time of transactions or get denied the transaction altogether. The preemptive strike also reduces the SP's loss if the credentials were indeed hacked.

The Service Provider elects to act on the risk score or not at all. For instance, if two different customers A and B at a given Service Provider receive a risk score of 70 and 92 respectively (range of 0-100) from the Central Risk Scoring service. Let us assume that the risk score for customer B is exceptionally high (beyond a particular threshold defined by the SP), and the Service Provider should prevent the Customer B from gaining access to its service because there is a high probability that this could be a fraudster using stolen credentials. The Service Provider can contact the Customer via an alternate channel (telephone call or face-to-face) and confirm the identity before forcing the Customer to reset their password and select a more complex password. Once the password is reset to a more complex password, the service provider can notify the Central Risk Scoring service so that it can update the Customer Profile so that the risk score is reduced prior to any future login sessions.

However, for customer A, the risk Score of 70 represents an elevated risk relative to the rest of the population. The Service Provider can use this risk score to supplement its internal fraud control systems. If the customer is a high net-worth individual than the elevated risk score could trigger additional action like the instance above.

In one embodiment, the model is applied to actual CLC data at an SP. For example, let us say that we have an n successful CLC log-in attempts at a given SP over a given period of time. These n log-in attempts can be split into 3 categories (as shown in FIG. 4):

1. Log-in attempts by the customer of the credentials (no risk); $n_1$ (shown in FIG. 4 as Green .'s)
2. Log-in attempts by fraudsters using customers credentials that were identified by SP's current controls (medium risk); $n_2$ (shown in FIG. 4 as Blue *'s)

3. Log-in attempts by fraudsters using customers credentials that were NOT identified by SP's current controls (high risk); $n_3$ (shown in FIG. 4 as Red +'s)

The model prediction risk score, R, distinguishes between these three groups, with higher risk scores for the third group. FIG. 4 illustrates this characteristic with each of the three categories of logins shown with different color/symbol. The risk threshold that the SP sets is based on its risk tolerance (false negatives) and appetite for manual work (false positives), which then determines how useful and successful the model is at enabling the SP to successfully prevent fraud. In this simple example, the false positives are the percentage of green dots above the risk threshold line relative to the total number of dots, stars and +'s above the risk tolerance. Lower the false positive rate the more any log-in attempts from the 3rd group that are above the risk threshold line are stopped and reviewed manually or digitally or in an analog fashion by the SP's fraud team and the fraud is prevented. If the risk factor score reaches a certain threshold, an SP can set up a system that automatically suspends any activity associated with that specific login credential.

As the SP incorporates this model into their fraud prevention processes, the reasons for each false positive and negative are fed back into the model as a feedback loop. Also, the model functionality and weightage of the various data elements, i.e., the Xs, changes over time to adapt and improve as would be the case with any model utilizing machine learning or continuous-feedback mechanisms.

Once deployed, another benefit of using a machine learning model is that the model can be continuously updated to deal with the shifting strategies of ongoing fraud. The model has a feedback mechanism from the Service Provider back to the Credential Risk Scoring Engine about the accuracy of the prediction. If the model predicted a low risk score indicating that the CLCs for the user had a very low risk for fraud, and it turned out that there was actually some fraud committed during the transaction, then this valuable data once fed back to the machine learning model can tweak the weightages to change the predictions of future transactions.
Model Validation Inventors acquired data on customers through surveys, who confirmed they had experienced ATO fraud in financial services. They also acquired data on a control population from the general population. They then applied the techniques outlined herein and the models were able to demonstrate the risk scores of the ATO fraud population to be as much as 4× higher than the risk scores of the general population.

The inventors conducted a consumer survey of over 2000 individuals in the US to gather data about account take over fraud patterns across multiple financial institutions. The detailed survey covered numerous yes/no and multiple-choice questions and free-response answers related to fraud on their checking and savings banking account in the last 2 years (e.g.: When did the fraud happen? Were other accounts hacked? How much money was stolen? Did the bank issue a new checkbook with a new account). The rich self-reported consumer data also included insights about the consumer's password hygiene habits (e.g. usage of same password across multiple service providers etc.—before and after the fraud).

Out of the 2000 responses to the survey, the inventors' analysis of the responses confirmed ~200 users who had legitimate account take over fraud at a financial institution.

The control group consisted of marketing lists of random sampling of 13,000 US consumers with a high propensity for online banking.

The inventors then scanned the dark web, deep web and the surface web for information related to these 15,000 consumer login credentials. They created a Consumer Profile Database to aggregate all the Personally Identifiable Information by each unique customer. They were able to decrypt and decipher the clear text passwords for most of the users. They analyzed all the passwords that they uncovered for each user and calculated a score based on password complexity, password reuse and password "distance" between the passwords. They applied several machine learning techniques for the fraud vs non-fraud data set and were able to build predictive models that clearly differentiated the two clusters based on several data elements.

What is claimed is:

1. A method for preemptively reducing the risk of compromising the login credentials of a Customer Cn, comprising the steps of:

(A) continuously searching data elements in at least one website of a dark web and at least one website of one of a deep web and a surface web or both of the deep web and the surface web, for information associated with said login credential,
wherein said searching of data elements in the deep web is based, at least in part, on the information from the dark web,
wherein searching the data elements in a surface web are based, at least in part, on the data elements' information from the dark web and/or the deep web, and
wherein said dark web is accessible over an anonymous network;

(B) incorporating the unique authentication and access controls of the Service Provider with the information in Step A;

(C) determining a dynamic Risk Score for said login credential of said Customer Cn using the formula:

$$R(C_n, SPi, t) = f\{X1, X2, X3 \ldots\}$$

wherein the dynamic Risk Score R is specific to a Customer Cn, at a specific Service Provider SPi, and at a given time t;
wherein said dynamic Risk Score is a function of Xs, wherein said Xs are data elements;
wherein said dynamic Risk Score is calculated using multivariate machine-learning models such that they intelligently analyze said data elements Xs and provide said dynamic Risk Score;
wherein said dynamic Risk Score, as it relates to said specific Service Provider SPi, is dynamically communicated to said specific Service Provider SPi prior to a transaction request, and not after said transaction request using an application programming interface (API);

(D) comparing said dynamic Risk Score, dynamically or periodically with a pre-determined threshold Risk Score; and taking one of the following steps:
  (D1) modifying an authentication requirement for the Customer and seeking said authentication from the Customer, wherein said authentication requirement is a function of the breach of said pre-determined threshold Risk Score;
  (D2) modifying an authentication requirement for the Customer, while temporarily suspending services to said Customer credential, pre-emptively notifying the Customer of said suspension, seeking said authentication from said Customer, and restarting or shutting down services connected to said Customer credentials.

2. The method as recited in claim 1, wherein modifying the authentication requirement comprises identifying an enhanced security protocol to authenticate the User.

3. The method as recited in claim 2, wherein the enhanced security protocol comprises a multi-factor authentication of the User.

4. The method as recited in claim 1, wherein the data elements comprise one of dynamic content, multimedia content, audio content, and a picture.

5. The method of claim 1, wherein the data elements are searched using configurable search parameters.

6. The method of claim 1, wherein the anonymous network comprises a Tor server.

7. A computer program product comprising:

a non-transitory computer readable storage medium comprising computer readable program code embodied therewith, the computer readable program code comprising:
- (A) computer readable program code configured to continuously receive information obtained from searching data elements in at least one website of a dark web and at least one website of one of a deep web and a surface web or both of the deep web and the surface web, for information associated with a login credential,
- wherein said searching of data elements in the deep web is based, at least in part, on the information from the dark web,
- wherein searching the data elements in a surface web are based, at least in part, on the data elements' information from the dark web and/or the deep web, and
- wherein said dark web is accessible over an anonymous network;
- (B) computer readable program code configured to dynamically incorporate the unique authentication and access controls of the Service Provider with the information in computer readable program code in (A);
- (C) computer readable program code configured to determine a dynamic Risk Score for said login credential of said Customer Cn using the formula:

$$R(C_n, SP_i, t) = f\{X1, X2, X3\}$$

wherein the dynamic Risk Score R is specific to a Customer Cn, at a specific Service Provider SPi, and at a given time t,
wherein said dynamic Risk Score is a function of Xs, wherein said Xs are data elements,
wherein said dynamic Risk Score is calculated using multivariate machine-learning models such that they intelligently analyze said data elements Xs and provide said dynamic Risk Score; a risk score, at least in part, on the information associated with a User login credentials;
- (D) computer readable program code configured to compare said dynamic Risk Score, dynamically or periodically with a pre-determined threshold Risk Score;
- (E) computer readable program code configured to modify an authentication requirement for the Customer and seeking said authentication from the Customer, wherein said authentication requirement is a function of the breach of said pre-determined threshold Risk Score; and
- (F) computer readable program code configured to modify an authentication requirement for the Customer, while temporarily suspending services to said Customer credential, pre-emptively notifying the Customer of said suspension, seeking said authentication from said Customer, and restarting or shutting down services connected to said Customer credentials.

8. The computer program product of claim 7, wherein the information is related to one of a hacker forum, a dark web uniform resource locator (URL), and the User login credential.

9. A system comprising:
- (A) a data processor configured to execute a first set of instructions to: continuously search data elements in at least one website of a dark web and at least one website of one of a deep web and a surface web or both of the deep web and the surface web, for information associated with said login credential, wherein said searching of data elements in the deep web is based, at least in part, on the information from the dark web,
- wherein searching the data elements in a surface web are based, at least in part, on the data elements' information from the dark web and/or the deep web, and
- wherein said dark web is accessible over an anonymous network;
- (B) a system configured to incorporate the unique authentication and access controls of the Service Provider with the information in System A;
- (C) a Credential Risk Scoring Engine processor configured to determine a dynamic Risk Score for said login credential of said Customer Cn using the formula:

$$R(C_n, SP_i, t) = f\{X1, X2, X3\}$$

wherein the dynamic Risk Score R is specific to a Customer Cn, at a specific Service Provider SPi, and at a given time t;
wherein said dynamic Risk Score is a function of Xs, wherein said Xs are data elements;
wherein said dynamic Risk Score is calculated using multivariate machine-learning models such that they intelligently analyze said data elements Xs and provide said dynamic Risk Score;
wherein said dynamic Risk Score, as it relates to said specific Service Provider SPi, is dynamically communicated to said specific Service Provider SPi prior to a transaction request, and not after said transaction request using an application programming interface (API);
- (D) a data processor to compare said dynamic Risk Score in (C), dynamically or periodically, with a pre-determined threshold Risk Score;
- (E) a system configured to modify an authentication requirement for the Customer and seeking said authentication from the Customer, wherein said authentication requirement is a function of the breach of said pre-determined threshold Risk Score; and
- (F) a system configured to modify an authentication requirement for the Customer, while temporarily suspending services to said Customer credential, pre-emptively notifying the Customer of said suspension, seeking said authentication from said Customer, and restarting or shutting down services connected to said Customer credentials.

10. The method as recited in claim 1, further comprising: generating a machine learning model with feedback from the Service Provider on the accuracy of the previous score.

* * * * *